Patented Oct. 30, 1934

1,978,812

UNITED STATES PATENT OFFICE 1,978,812

MANUFACTURE OF GOLF BALLS AND THE LIKE

Edward Arthur Murphy, Erdington, Birmingham, Douglas Frank Twiss, Wylde Green, and Robert Gilbert James, Selley Oak, Birmingham, England, assignors to Dunlop Rubber Company Limited, Fort Dunlop, Erdington, Birmingham, England, a corporation of Great Britain No Drawing. Application June 8, 1931, Serial No. 543,016. In Great Britain July 29, 1930

14 Claims. (Cl. 154—17)

This invention relates to the manufacture of golf balls and the like and has for its object the application in the manufacture of balls of the aforesaid type of aqueous emulsions or dispersions of organic materials of the kinds hereinafter specified whereby the employment of expensive solvents is eliminated.

According to one embodiment of the invention the method for the manufacture of golf balls or the like comprising a core and an outer shell of gutta percha and the like material comprises applying to the aforesaid cores a layer or successive layers of the aqueous emulsions or dispersions of the kinds hereinafter specified by any one or more of such known operations as dipping, painting or spraying so as to produce a shell of suitable thickness and thereafter moulding the ball made in this manner in order to impart to it the desired size, shape or surface marking.

Each layer of aqueous emulsions or dispersions applied is preferably allowed to dry out in warm air before another is superimposed. The moulding of the ball is preferably carried out at moderate temperature in order to impart to it the desired size, shape or surface marking.

According to a further embodiment of the invention the method for the manufacture of golf balls or the like comprises applying to the aforesaid cores outer shells of gutta-percha or the like material produced by any one or more operations such as dipping, spreading, spraying, moulding or electrophoresis upon suitable moulds or formers from aqueous emulsions or dispersions of the kinds hereinafter specified and thereafter moulding the balls made in this manner preferably at moderate temperature in order to impart to them the desired shape, size or surface marking.

The formers or moulds may be porous or non-porous for instance, they may be made of suitable material such as glass, metal, porcelain or clay.

The emulsions or dispersions comprise by way of example, those consisting of or containing gutta-percha, balata, rubber or similar vegetable resins occurring naturally or artificially obtained and in vulcanized or unvulcanized condition.

Aqueous dispersions of coagulated rubber, vulcanised rubber, thermoplastic derivatives of rubber, synthetic or artificial rubber or rubber-like substances of any origin, may also be employed if desired as alternatives or admixtures.

Waste, reclaim or mineral rubber can be used in admixture.

Any of the aforesaid dispersions may contain the usual known compounding ingredients.

Concentrates such as are described and claimed in Patent No. 1,846,164, February 23, 1932 or Patent No. 1,793,265 to which may be added any one or more of the usual compounding ingredients may also be employed.

Artificial dispersions of gutta-percha, balata or rubber can also be employed containing coarse particles of one or more of the aforesaid substances in suspension.

Furthermore, as the aqueous emulsions or dispersions aforesaid, whether of the fine or coarse type may be too fluid for ease in manipulation, these may be converted into stiff froths in which any coarse particles present are still held in suspension, for instance, a composition comprising coarse particles of gutta-percha in rubber latex can be employed in this manner.

The following examples illustrate how the process can be effected:—

Example 1

A 40% aqueous dispersion of gutta-percha is prepared according to the British Patent No. 296,685. A 50% dispersion of titanium white is prepared by passing a mixture of titanium white, water and suitable protective colloid through a colloid mill. These dispersions are mixed uniformly with latex (concentration 60%) so as to give the ingredients in the proportions:—

| | Parts by weight |
|---|---|
| Rubber | 30 |
| Gutta-percha | 70 |
| Titanium white | 5 |

The mixed dispersion is painted on a golf ball core covered with rubber thread under tension in the usual way, and is then dried in a current of warm air. The operation is repeated until sufficient thickness is obtained. When quite dry the ball may be moulded and painted in the usual way.

Example 2

Latex (concentration 60%) and titanium white dispersion (concentration 50%) are mixed uniformly so as to give the proportions:—

| | Parts by weight |
|---|---|
| Rubber | 25 |
| Titanium white | 5 |

75 parts by weight of dry disintegrated gutta percha are stirred well into the mixed dispersion, 1 part of lime (mixed into a cream with water) added and the whole stirred until a crumb is obtained. The wet crumb is pressed round a golf ball core covered in the usual way with rubber under tension, and is dried either in a current of warm air or in a porous mould. The dried ball may be finally moulded and painted in the usual way.

Having now particularly described and ascertained the nature of our said invention and in what manner the same is to be performed, we declare that what we claim is:—

1. A method of making golf balls which comprises forming a homogeneous dispersion of rubber and gutta-containing material, applying said dispersion to the surface threads of a golf ball core of wound rubber threads under tension while avoiding penetration beneath the exposed thread to form a superficial layer about said surface threads, drying said deposit and moulding it when dry under heat and pressure.

2. The method of claim 1 in which successive layers of the dispersion are applied and each layer dried before the next one is applied.

3. The method of claim 1, in which the gutta material is in the form of coarse particles.

4. The method of claim 1, in which the dispersion is in the form of a stiff froth.

5. The method of claim 1, in which the rubber dispersion is in the form of a stiff froth and the gutta material is in the form of relatively coarse particles.

6. The method of claim 1, in which the dispersion contains a pigment.

7. A method of forming an enclosing cover on a ball of thread wound under tension, which comprises applying on the outer layers only while preventing penetration beneath the exposed layers of said ball a coating of the dispersed material of an aqueous dispersion of cover composition.

8. A method of forming an enclosing cover on a ball of thread wound under tension which comprises painting on the exterior of said ball an aqueous dispersion of cover composition.

9. A method of forming an enclosing cover on a ball of thread wound under tension which comprises superficially applying on the exterior of said ball an aqueous dispersion of cover composition while preventing penetration beneath the exposed layers.

10. A method of forming an enclosing cover on a ball of thread wound under tension which comprises forming an aqueous dispersion of cover composition into a wet crumb and shaping this wet crumb about the ball.

11. The method of claim 7 in which the aqueous dispersion contains suspended particles coarser than the dispersed material.

12. The method of claim 7 in which the dispensed material is in the form of a stiff froth.

13. The method of claim 7 in which the deposit is thereafter dried and molded.

14. The method of claim 7 in which the dispersed material is deposited in successive layers and each layer is dried before another layer is deposited.

EDWARD ARTHUR MURPHY.
DOUGLAS FRANK TWISS.
ROBERT GILBERT JAMES.